United States Patent [19]
Hyodo

[11] Patent Number: 4,998,135
[45] Date of Patent: Mar. 5, 1991

[54] MECHANISM FOR MOVING A PROJECTION LENS ASSEMBLY TO ALTER PROJECTING MAGNIFICATION

[75] Inventor: Haruhiro Hyodo, Osaka, Japan

[73] Assignee: Minolta Camera Kabushiki Kaisha, Osaka, Japan

[21] Appl. No.: 359,348

[22] Filed: May 31, 1989

[30] Foreign Application Priority Data

Jun. 1, 1988 [JP] Japan .................................... 136338

[51] Int. Cl.⁵ ........................................ G03B 27/34
[52] U.S. Cl. ................................. 355/56; 355/58
[58] Field of Search ........................... 355/55-58, 355/235, 243

[56] References Cited

U.S. PATENT DOCUMENTS

| | | | |
|---|---|---|---|
| 4,557,594 | 12/1985 | Negoro | 355/58 |
| 4,618,253 | 10/1986 | Arai | 355/57 |
| 4,641,957 | 2/1987 | Takeda et al. | 355/58 |
| 4,805,001 | 2/1989 | Hayashi et al. | 355/58 |

*Primary Examiner*—L. T. Hix
*Assistant Examiner*—D. Rutledge
*Attorney, Agent, or Firm*—Price, Gess & Ubell

[57] ABSTRACT

A mechanism for curvedly moving a projection lens assembly accommodated in a lens barrel to alter projecting magnification of a projecting optical system is comprised of a support member for supporting a lens barrel accommodating a projection lens assembly, a movable member for holding thereon the support member so that the support member is movable in a first direction, the movable member being movable in a second direction, a guide member in the form of a plate fixedly mounted below the movable member for restricting the position of the support member in the first direction and for guiding the movable member in the second direction, and a drive unit for moving the movable member to an appropriate location corresponding to an altered projecting magnification. The drive unit includes a plurality of pulleys, an endless wire passed about these pulleys and a stepping motor coupled with one of the pulleys.

4 Claims, 4 Drawing Sheets

MECHANISM FOR MOVING A PROJECTION LENS ASSEMBLY TO ALTER PROJECTING MAGNIFICATION

BACKGROUND OF THE INVENTION

1. Field of the Invention

The present invention generally relates to a mechanism for moving a projection lens assembly in a projecting optical system to alter projecting magnification, and more particularly, to the improvements in the mechanism for moving the projection lens assembly along a curved path when the projecting magnification is altered.

2. Description of the Related Art

FIG. 1 depicts a projecting optical system employed in a conventional electrophotographic copying apparatus. In FIG. 1, light emitted from a light source 1 is reflected by an original document (not shown) placed on a document platform 2. The light is then applied to a photosensitive drum 9 via a slit member 3, scanning mirrors 4, 5 and 6, a projection lens assembly 7 and a projection mirror 8. In this way, an image on the original document is projected onto the photosensitive drum 9.

FIG. 2 is a diagram indicative of the relationship between an original document P and projected images in an optical system of the type in which the document P is placed in abutment with a reference position PO located on one side of the document platform 2. In such an optical system, the lens assembly 7 is moved along a certain predetermined curve when the projecting magnification is altered. More specifically, the lens assembly 7 is located at the very center *7a* between the document P and a projected image Qa at an equal size magnification. At an enlarged size magnification, this lens assembly 7 is drawn towards a position *7b*, which is closer to the document P and the reference position PO than the central position *7a* is. In contrast, at a reduced size magnification, the lens assembly 7 is drawn towards a position *7c*, which is closer to the projected image and farther from the reference position PO than the central position *7a* is. By curvedly moving the lens assembly 7 in this way, the projected images Qa, Qb and Qc respectively at the equal size magnification, the enlarged size magnification and the reduced size magnification are caused to correspond to a reference position QO located on one side of the photosensitive drum 9. Upon movement of the lens assembly 7, the projection mirror 8 is moved to correspond to the change in conjugate length.

FIGS. 3 and 4 depict a conventional mechanism for moving the projection lens assembly, which is employed in the above described projecting optical system. This mechanism is comprised of a barrel table 23 for securely supporting a lens barrel 10 of the lens assembly 7 and a movable member 22 which can move in the direction as shown by an arrow A. The barrel table 23 is so held on the movable member 22 as to be slidable in the direction as shown by an arrow B. The lens barrel 10 is fixedly mounted, by means of a belt 12, on a support block 11, which is placed on the barrel table 23. The table 23 is provided at its lower portion with guide pins 13 and 14, which are in mesh with respective openings **22*a* and 22*b* formed in the movable member 22 and elongated in the direction of the arrow B. A free end of the guide pin 14 extends downwardly through the elongated opening 22*b* and is provided with a guide roller 17, which is in contact with a cam surface 15*a* of a cam plate 15 fixed to the apparatus body. The movable member 22 is screwed to a guide rod 20, which is provided at its peripheral surface with a feed screw 20*a* and coupled to a stepping motor 21**.

When the lens assembly 7 is moved to alter the projecting magnification, the guide rod 20 is rotated by the stepping motor 21 to move the movable member 22 in the direction of the arrow A. Upon such movement, the barrel table 23 moves along the cam surface **15*a* in the direction of the arrow B, since the guide roller 17 is in contact with the cam surface 15*a*. Accordingly, the lens assembly 7** moves in both the directions of the arrows A and B.

However, in the foregoing conventional mechanism for moving the projection lens assembly, the guide rod 20 for guiding the lens assembly in the direction of the arrow A is not located on the same plane as the cam plate 15 for restricting the position of the lens assembly in the direction of the arrow B, thus resulting in an increase of the volume occupied by the mechanism. Accordingly, it is difficult to make the projecting optical system thin and the entire apparatus compact.

The U.S. Pat. No. 4,691,957 discloses another mechanism for curvedly moving a projection lens assembly when the projecting magnification is altered. In this mechanism, the lens assembly is moved along a guide shaft extending obliquely with respect to the optical axis. Furthermore, the guide shaft itself is under translation operation. Accordingly, the mechanism as disclosed in this patent is complicated in construction. In addition, since a cam plate for positioning the lens assembly is disposed aside the projection lens assembly, the entire mechanism requires a relatively wide space.

SUMMARY OF THE INVENTION

Accordingly, the present invention has been developed with a view to substantially eliminating the above described disadvantages inherent in the prior art mechanism for moving a projection lens assembly in a projecting optical system to alter projecting magnification, and has for its essential object to provide an improved mechanism which can constitute a compact projecting optical system.

Another important object of the present invention is to provide a mechanism of the above described type which is capable of guiding the movement of the lens assembly in one direction and of positioning the lens assembly in accordance with the projecting magnification, using a single guide plate.

In accomplishing these and other objects, the mechanism according to one preferred embodiment of the present invention comprises a support member for supporting a lens barrel accommodating a projection lens assembly, a movable member for holding thereon the support member so that the support member is movable in a first direction, said movable member being movable in a second direction, a guide member in the form of a plate fixedly mounted below the movable member for restricting the position of the support member in the first direction and for guiding the movable member in the second direction, and means for moving the movable member to an appropriate location corresponding to an altered projecting magnification.

The means for moving the movable member is comprised of a plurality of pulleys, an endless wire passed about these pulleys and a stepping motor coupled with one of the pulleys.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
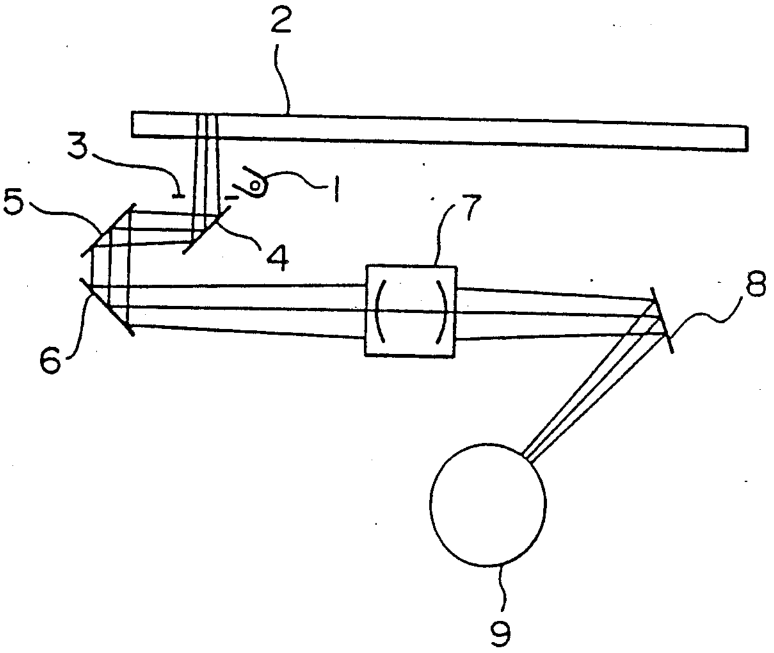
Fig. 1 PRIOR ART
FIG. 1 is a schematic view of a projecting optical system employed in a conventional electrophotographic copying apparatus.
Figure 2:
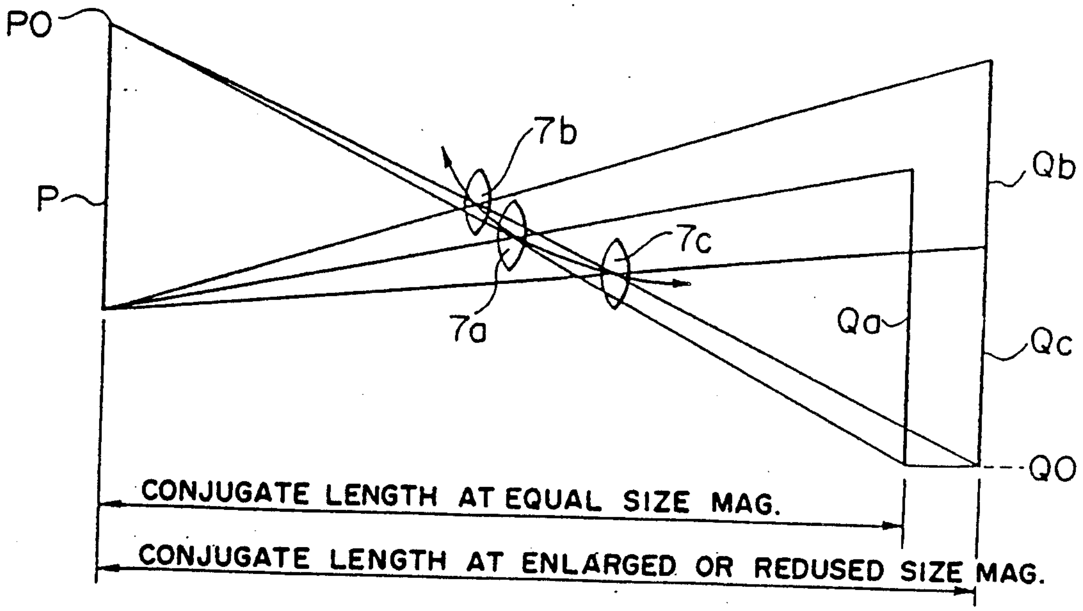
Fig. 2 PRIOR ART
FIG. 2 is a diagram indicative of the relationship between an original document and projected images in the optical system of FIG. 1.
Figure 3:
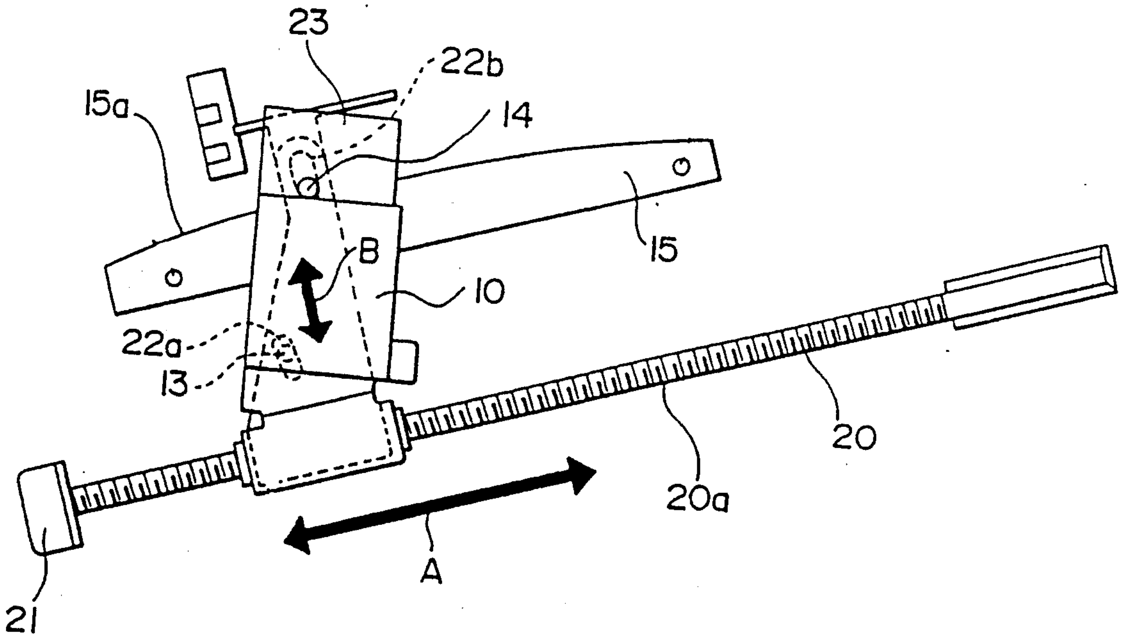
Fig. 3 PRIOR ART
FIG. 3 is a top plan view of a conventional mechanism for moving a projection lens assembly.
Figure 4:
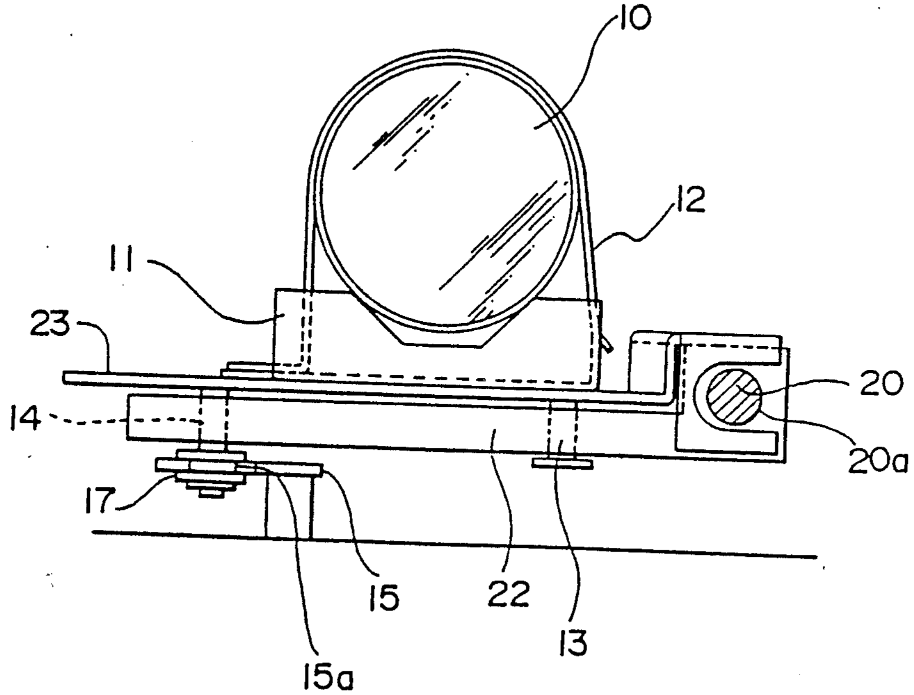
Fig. 4 PRIOR ART
FIG. 4 is a side elevational view of the mechanism of FIG. 3.
Figure 5:
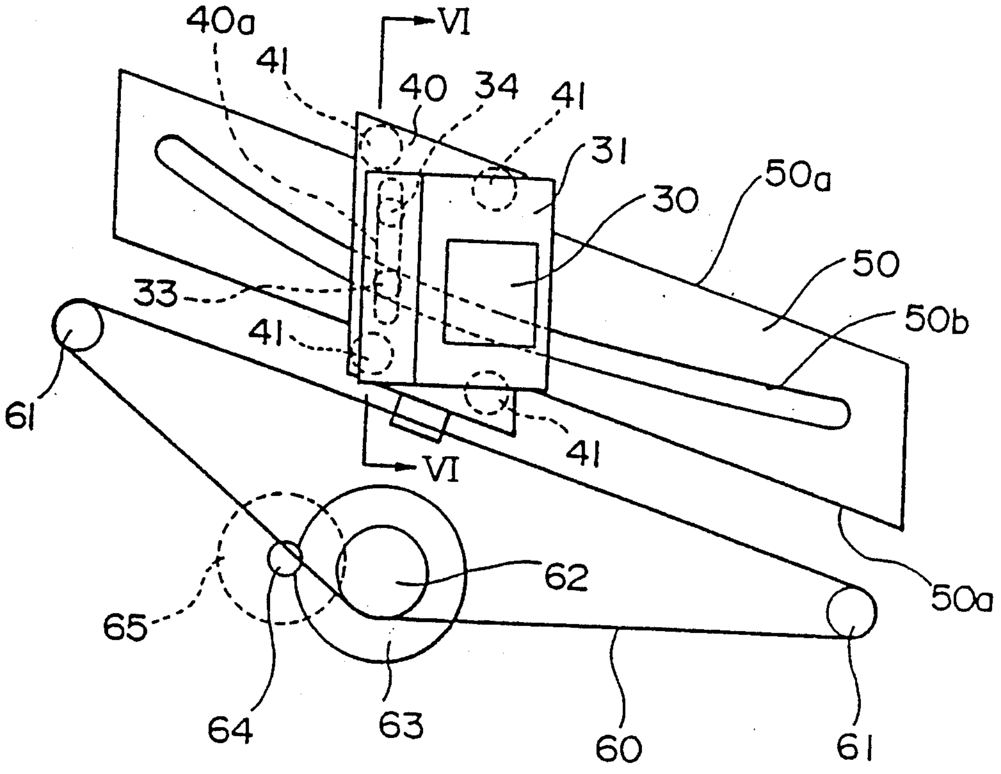
FIG. 5 is a top plan view of a mechanism for moving a projection lens assembly according to one preferred embodiment of the present invention.
Figure 6:
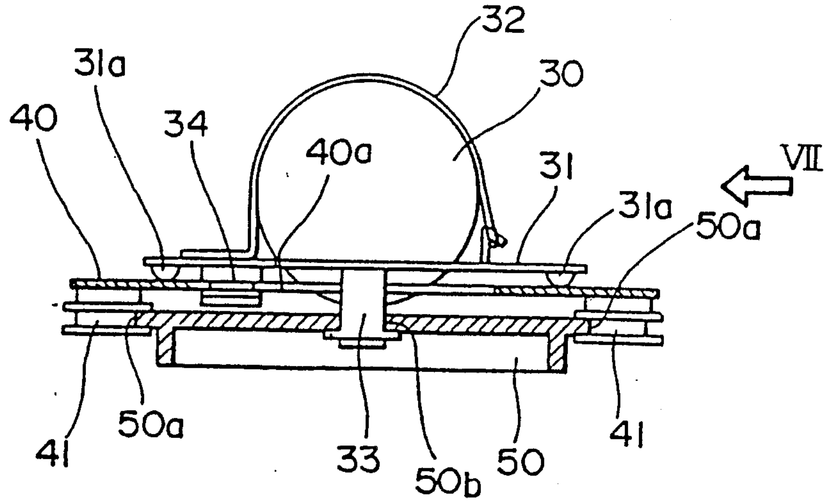
FIG. 6 is an enlarged section taken along the line VI—VI in FIG. 5.
Figure 7:
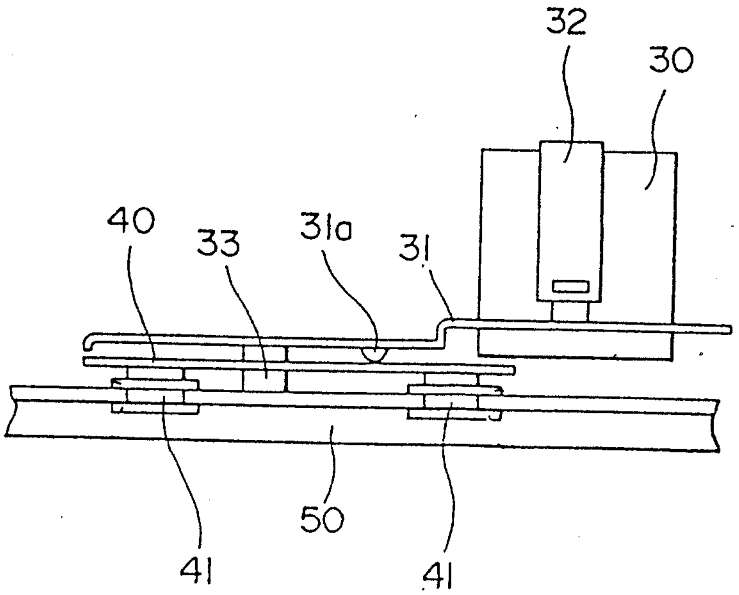
FIG. 7 is an elevational view of the mechanism of FIG. 5 when viewed from an arrow VII in FIG. 6.

FIGS. 5, 6 and 7 depict a mechanism for moving a projection lens assembly according to one preferred embodiment of the present invention, which can be used in the projecting optical system of the electrophotographic copying apparatus previously mentioned with reference to FIGS. 1 and 2 and can move the projection lens assembly in compliance with the change of the projecting magnification.

This mechanism is comprised of a support plate 31 for securely supporting a lens barrel 30 accommodating the lens assembly, a movable member 40 for slidably holding the support plate 31 thereon and a guide plate 50 disposed below the movable member 40.

The lens barrel 30 is fixedly mounted, by means of a belt 32, on the support plate 31. The support plate 31 is placed on the movable member 40 and provided on its lower surface with two projections 31*a* aligned in the direction perpendicular to the optical axis and two guide pins 33 and 34 juxtaposed with each other in the same direction as the projections 31*a*. The guide pin 33 extends downwards through an elongated opening 40*a* formed in the movable member 40 and engages with a curved guide slit 50*b* formed at a central portion of the guide plate 50. The guide pin 34 engages with the elongated opening 40*a* of the movable member 40. Since this opening 40*a* is elongated in the direction perpendicular to the optical axis, the support plate 31 can slide in this direction with respect to the movable member 40.

As shown in FIG. 7, the projections 31*a* are located in the middle between a lens barrel support portion of the support plate 31 and the guide pins 33 and 34 in the direction of the optical axis. Accordingly, the lens barrel 30 is supported by the projections 31*a* which act as fulcra.

The movable member 40 is provided at four corners on its lower surface with four guide pulleys 41. The guide plate 50 is provided at its opposite sides with guide rails 50*a* extending straight and forming a predetermined angle with respect to the optical axis. The movable member 40 moves along the guide rails 50*a*, because all the guide pulleys 41 engage with these guide rails 50*a*. The engagement between the guide pin 33 and the guide slit 50*b* positions the support plate 31 at an appropriate location corresponding to the projecting magnification.

An endless wire 60 is attached to the movable member 40 and passed about two idle pulleys 61 and a drive pulley 62 for driving the endless wire 60. The two idle pulleys 61 render the wire between them to be in parallel with the guide rails 50*a*. A stepping motor 65 is coupled with the drive pulley 62 via reduction gears 63 and 64.

When the projecting magnification is altered, the projection lens assembly is moved to a position appropriate to a selected projecting magnification. In this event, a pulse signal corresponding to the selected magnification is supplied to the stepping motor 65 to rotate it. The rotation of the stepping motor 65 is transmitted to the drive pulley 62 via the reduction gears 63 and 64 so that the movable member 40 may move towards the predetermined position via the wire 60. Upon movement of the movable member 40, the support plate 31 moves along the elongated opening 40*a* of the movable member 40 to a position determined by the engagement between the guide pin 33 and the curved guide slit 50*b*. As a result, the lens barrel 30 of the lens assembly placed on the support plate 31 moves to the predetermined position corresponding to the projecting magnification as explained with reference to FIG. 2.

From the foregoing, according to the mechanism of the present invention, the single guide plate 50 disposed below the lens assembly can guide the movement of the lens assembly and position it at an appropriate location corresponding to the projecting magnification. This mechanism, therefore, can constitute a compact projecting optical system, as compared with the conventional mechanism.

Moreover, when the lens assembly moves, the guide pins 33 and 34 of the support plate 31 and the guide pulleys 41 of the movable member 40 always engage with the elongated opening 40*a* of the movable member 40 and the guide rails 50*a*of the guide plate 50, respectively. Accordingly, the optical axis can move correctly in parallel, resulting in no distortion or no out-of-focus effect on projected images.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A mechanism for curvedly moving a projection lens assembly accommodated in a lens barrel to alter projecting magnification of a projecting optical system, said mechanism comprising:

a support member for supporting the lens barrel;

a movable member for holding thereon said support member so that said support member is movable in a first direction, said movable member being movable in a second direction;

a guide member in the form of a plate fixedly mounted below said movable member for restricting a position of said support member in said first direction and for guiding said movable member in said second direction; and means for moving said movable member to an appropriate location corresponding to an altered projecting magnification.

2. The mechanism according to claim 1, wherein said means for moving said movable member comprises a stepping motor.

3. A mechanism for curvedly moving a projection lens assembly accommodated in a lens barrel to alter projecting magnification of a projecting optical system, said mechanism comprising:

a support member for supporting the lens barrel;

a movable member for holding thereon said support member so that said support member is movable in a first direction, said movable member being movable in a second direction;

a plurality of pin members fixedly mounted on said support member and extending downwards through said movable member;

engagement means formed on said movable member;

a guide member in the form of a plate fixedly mounted below said movable member and provided substantially on the same plane with a guide opening for restricting, upon engagement between said pin members and said guide opening, a position of said support member in said first direction and guide means for guiding, upon engagement between said engagement means and said guide means, said movable member in said second direction; and means for moving said movable member to an appropriate location corresponding to an altered projecting magnification.

4. The mechanism according to claim 3, wherein said means for moving said movable member comprises a stepping motor.

* * * * *